(12) United States Patent
Okahira et al.

(10) Patent No.: US 7,900,307 B2
(45) Date of Patent: Mar. 8, 2011

(54) BOARDING BRIDGE

(75) Inventors: Yukio Okahira, Mihara (JP); Katsumi Tottori, Kawasaki (JP); Toshiro Fushiya, Mihara (JP); Yasuaki Shimizu, Mihara (JP)

(73) Assignee: Mitsubishi Heavy Industries Transportation Equipment Engineering & Service Co., Ltd., Kanagawa (JP)

( * ) Notice: Subject to any disclaimer, the term of this patent is extended or adjusted under 35 U.S.C. 154(b) by 89 days.

(21) Appl. No.: 12/333,801

(22) Filed: Dec. 12, 2008

(65) Prior Publication Data

US 2009/0205145 A1   Aug. 20, 2009

(30) Foreign Application Priority Data

Mar. 16, 2007   (JP) .................................. 2007-069038

(51) Int. Cl.
*E01D 1/00* (2006.01)
(52) U.S. Cl. ............. 14/71.5; 14/69.5; 14/71.1; 14/71.3; 14/71.7; 14/72.5
(58) Field of Classification Search ........... 14/69.5–72.5
See application file for complete search history.

(56) References Cited

U.S. PATENT DOCUMENTS

| 3,122,789 | A | * | 3/1964 | Coffee | 425/466 |
|---|---|---|---|---|---|
| 3,693,204 | A | * | 9/1972 | Eggert, Jr. | 14/71.5 |
| 3,808,626 | A | * | 5/1974 | Magill | 14/71.5 |
| 3,883,918 | A | * | 5/1975 | Magill | 14/71.5 |
| 4,543,677 | A | * | 10/1985 | Haglund et al. | 14/71.5 |
| 4,553,720 | A | * | 11/1985 | Harder | 244/137.2 |
| 6,212,724 | B1 | * | 4/2001 | Zhou | 14/71.5 |
| 6,330,726 | B1 | * | 12/2001 | Hone et al. | 14/71.5 |
| 6,757,926 | B2 | * | 7/2004 | Konya | 14/71.5 |
| 6,898,816 | B2 | * | 5/2005 | Tholen et al. | 14/71.5 |
| 7,188,383 | B2 | * | 3/2007 | Tholen et al. | 14/71.5 |

FOREIGN PATENT DOCUMENTS

| JP | 03-204399 A | 9/1991 |
|---|---|---|
| JP | 2004-90770 | 3/2004 |
| JP | 03-116867 U | 11/2005 |
| JP | 2008-230297 A | 10/2008 |

OTHER PUBLICATIONS

Office Action mailed for Japanese Patent Application No. 2007-069038, dated Nov. 16, 2010, together with an English Translation of the Office Action.

* cited by examiner

*Primary Examiner* — Raymond W Addie
(74) *Attorney, Agent, or Firm* — Thomas & Karceski, P.C.

(57) ABSTRACT

It is an object to provide a boarding bridge in which differences in level are eliminated between walkway portions of adjacent gangway units so that falling or the like of passengers can be prevented. A boarding bridge is provided in which a proximal-end tunnel and a distal-end tunnel are telescopically fitted and extend and contract by relative movement in a longitudinal direction, wherein, of the proximal-end tunnel and the distal-end tunnel, a variable-length walkway of the distal-end tunnel located on the outside is configured to move between a passage position set at a predetermined height and an outside-of-passage position located lower than the passage position; and the longitudinal length of the passage portion is changed in accordance with a moving distance along with the movement relative to the proximal-end tunnel.

9 Claims, 8 Drawing Sheets

BOARDING BRIDGE

CROSS-REFERENCE TO RELATED APPLICATIONS

This is a U.S. Non-Provisional Patent Application that relates to Japanese Patent Application No. 2007-069038, filed on Mar. 16, 2007, the contents of which are incorporated herein by reference.

BACKGROUND OF THE INVENTION

1. Field of the Invention

The present invention relates to boarding bridges for use in boarding and alighting of passengers of airplanes, vessels, and so on.

2. Description of Related Art

Boarding bridges are tunnel-shaped walking gangways that connect, for example, an airport terminal building and an airplane, to allow direct boarding and alighting of passengers between the terminal building and the airplane.

The intermediate walkway portion of a boarding bridge is constituted by a plurality of telescopically fitted gangway units and extends and contracts by the relative movement of the gangway units in the longitudinal direction. Thus, it covers the gap between a terminal building and an airplane.

However, since the gangway units are fitted telescopically, the passages in adjacent gangway units have a level difference, and there is a risk of passengers stumbling and falling over the level difference.

To eliminate the level differences, for example, a device that is laid over the step is used, as disclosed in Japanese Unexamined Patent Application, Publication No. 2004-90770.

However, as disclosed in Japanese Unexamined Patent Application, Publication No. 2004-90770, with the device laid over the step, there is still a possibility that passengers will stumble and fall over the step portion, because the level difference basically still remains.

There is also a problem in that wheelchair passengers have difficulty in passing therethrough.

In particular, the recent progress in barrier free facilities further requires gangways having no level differences.

BRIEF SUMMARY OF THE INVENTION

In consideration of the above-described problems, it is an object of the present invention to provide a boarding bridge in which level differences between walkway portions in adjacent gangway units are eliminated so that falling or the like of passengers can be prevented.

To solve the above-described problems, the present invention adopts the following solutions.

An aspect of the present invention is a boarding bridge in which a plurality of tubular gangway units are telescopically fitted and extend and contract by relative movement in a longitudinal direction, wherein, of the adjacent gangway units, a walkway portion of an outside gangway unit located on the outside is configured to move between a passage position set at a predetermined height and an outside-of-passage position located lower than the passage position; and the longitudinal length of the walkway portion located at the passage position is changed in accordance with a moving distance accompanying movement relative to an inside gangway unit located inside the telescopic structure.

With the boarding bridge according to this aspect, since the walkway portion of the outside gangway unit located on the outside is configured to move between a passage position set at a predetermined height and an outside-of-passage position located lower than the passage position, the length of the walkway portion at the passage position can be set so as to form part of the outside gangway unit in the longitudinal direction. This allows the passage position of the walkway portion of the outside gangway unit to be set at a position where it does not interfere with the inside gangway unit, and thus the passage position of the outside gangway unit can be set at substantially the same height as the passage of the inside gangway unit.

The longitudinal length of the passage position of the outside gangway unit is changed in accordance with a moving distance accompanying the movement relative to the inside gangway unit, that is, when the outside gangway unit moves in a direction away from the inside gangway unit, the longitudinal length of the passage position increases by that distance, and in contrast, when moving in an approaching direction, the longitudinal length decreases, and thus the walkway portions can be made continuous from the inside gangway unit to the outside gangway unit.

Thus, since a continuous passage at substantially the same height can be formed from the inside gangway unit to the outside gangway unit, problems such as falling/stumbling of passengers can be prevented. Passengers can pass therethrough with a feeling of safety, without such worries.

In this case, when the fixed walkway portions, disposed at the innermost gangway unit connected to a terminal and at the distal end of the outermost gangway unit, for example, a head unit connected to an airplane, are set at substantially the same height, all walkway portions of the boarding bridge can be configured at substantially the same height.

The above aspect may be configured such that one end of the walkway portion is mounted to the inside gangway unit so as not to move in position with respect to the inside gangway unit; and a position changing section that switches the walkway portion between the passage position and the outside-of-passage position is provided at the other end of the walkway portion, the position changing section being integrally mounted to the outside gangway unit.

With this configuration, since the position changing section is integrally mounted to the outside gangway unit, the position changing section moves automatically toward and away from the inside gangway unit by the movement along with the relative movement of the inside gangway unit and the outside gangway unit. Since one end of the walkway portion is mounted to the inside gangway unit so as not to move, the length of the walkway portion located at the passage position of the outside gangway unit changes, due to the movement of the position changing section, by the distance of the relative movement of the inside gangway unit and the outside gangway unit.

Accordingly, the length of the walkway portion located at the passage position of the outside gangway unit can be automatically adjusted.

In the above configuration, the position changing section may be a rotating body that is rotatably mounted, in a fixed position, to the outside gangway unit such that the axial direction is parallel to the width direction; and the walkway portion may be wound around the rotating body and is given a tension toward the other end.

With this configuration, when the inside gangway unit and the outside gangway unit move relative to each other, the rotating body moves relative to the walkway portion, one end of which is fixed to the inside gangway unit, and thus the rotating body rotates to move the walkway portion to the passage position or the outside-of-passage position.

That is, when the inside gangway unit and the outside gangway unit move away from each other, the rotating body rotates toward the inside gangway unit by the moving force of the outside gangway unit to allow a walkway portion located at the outside-of-passage position to move smoothly to the passage position. When the inside gangway unit and the outside gangway unit relatively move towards each other, the rotating body rotates in a direction away from the inside gangway unit due to a tension acting toward the other end to allow a walkway portion located at the passage position to move smoothly to the outside-of-passage position.

In the above aspect, the walkway portion may be formed of divided walkway portions divided into a plurality of pieces in the longitudinal direction.

With this configuration, the divided walkway portions can be moved between the passage position and the outside-of-passage position through the position changing section by curving or moving toward and away from each other, and thus, the divided walkway portions can be formed of a highly rigid material, to form stable walkway portions.

In the above configuration, it is preferable that an opening and closing walkway portion be provided, at a portion where the walkway portion is switched between the passage position and the outside-of-passage position, that selectively forms an extension of the passage position.

The discontinuous portion at the passage position, which is prone to occur at a portion where the walkway portion switches between the passage position and the outside-of-passage position, can be covered with the opening and closing walkway portion, thus reliably ensuring the continuity of the walkway portion.

Since the opening and closing walkway portion can be separated from the walkway portion when the walkway portion moves between the passage position and the outside-of-passage position, the walkway portion can be prevented from being damaged.

In the above aspect, both lateral ends of the divided walkway portions may be fixed to a pair of chains disposed on both sides; and one end of each chain may be fixed to the inside gangway unit, and the other ends, which are wound around sprockets that are rotatably mounted to the outside gangway unit and serve as the position changing section, may be retracted by a predetermined tension.

In the above aspect, both lateral ends of the divided walkway portions may be configured to engage with a pair of guide units fixed in position to both inside surfaces of the outside gangway unit; the guide units may each have a portion where the divided walkway portions are located at the passage position and the position changing section at which the divided walkway portion shifts to the outside-of-passage position; the adjacent divided walkway portions may be connected to allow a predetermined vertical movement and to have a small gap at the passage position; and the divided walkway portion at the inside gangway unit side may be fixed to the inside gangway unit.

According to the present invention, since the walkway portion of the outside gangway unit located on the outside is configured to be able to move between a passage position set at a predetermined height and an outside-of-passage position located lower than the passage position, the passage position of the outside gangway unit can be set at substantially the same height as the walkway portion of the inside gangway unit.

Since the longitudinal length of the passage position of the outside gangway unit is changed in accordance with a moving distance along with the movement relative to the inside gangway unit, the walkway portions can be made continuous from the inside gangway unit to the outside gangway unit.

This can therefore prevent problems such as falling/stumbling of passengers.

DETAILED DESCRIPTION OF THE INVENTION

Embodiments according to the present invention will be described hereinbelow with reference to the drawings.

First Embodiment

A first embodiment of the present invention will be described with reference to FIGS. 1 to 5, taking as an example a boarding bridge 1 in which a telescopic tunnel is composed of two tunnel portions.

Figure 1:
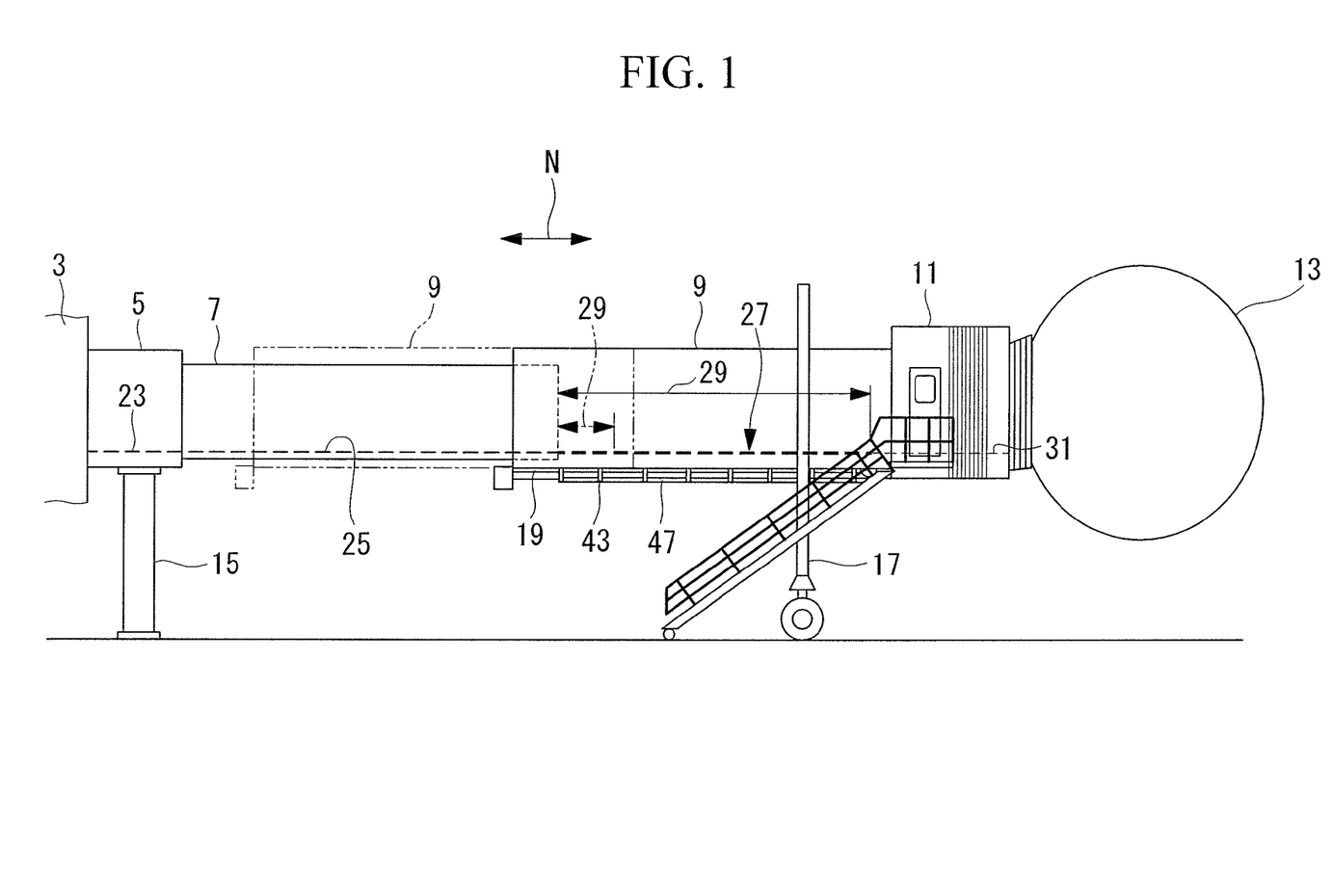
FIG. 1 is a front view showing the overall schematic configuration of a boarding bridge according to a first embodiment of the present invention.

FIG. 1 is a front view showing the overall schematic configuration of the boarding bridge 1.

The boarding bridge 1 connects an airport terminal building and an airplane 13 to form a passenger gangway between the terminal building and the airplane 13. This allows direct boarding and alighting.

The boarding bridge 1 is provided with a rotunda 5 fixed to a fixed bridge 3 communicating with the terminal building, a proximal-end tunnel (a gangway unit or inside gangway unit) 7 rotatably connected to the rotunda 5 in the horizontal direction, a distal-end tunnel (a gangway unit or outside gangway unit) 9 telescopically fitted on the distal end (the airplane 13 side) of the proximal-end tunnel 7, and a head 11 provided at the distal end of the distal-end tunnel 9.

A fixed leg 15 fixed to the ground is provided under the rotunda 5. A movable leg 17 is provided at the distal end in the longitudinal direction of the distal-end tunnel 9.

The boarding bridge 1 is supported by the fixed leg 15 and the movable leg 17.

The proximal-end tunnel 7 and the distal-end tunnel 9 are each shaped like a hollow rectangular bar. The proximal-end tunnel 7 and the distal-end tunnel 9 are formed in a tubular shape by disposing steel structural beams 19 (see FIG. 3) on the individual sides of the quadrangular bar and mounting aluminum alloy panels 21 (see FIG. 3) to both side surfaces and the top and bottom surfaces so as to connect the steel structural beams 19. The panels 21 may be formed of plastic, a transparent material (plastic, glass, etc.) or the like.

The cross-sectional area of the hollow portion of the distal-end tunnel 9 is configured to be larger than the cross-sectional area of the proximal-end tunnel 7. The hollow portion of the distal-end tunnel 9 is configured to guide the outer peripheral surface of the proximal-end tunnel 7.

The distal-end tunnel 9 is moved in a longitudinal direction N with the movement of the movable leg 17 to extend or contract the boarding bridge 1. This extension and contraction allows the boarding bridge 1 to cover the distance between the rotunda 5 and the airplane 13.

The head 11 is mounted to the distal end of the distal-end tunnel 9. The distal end of the head 11 is connected to the entrance of the airplane 13.

The head 11 is provided with an operating device (not shown) for operating the boarding bridge 1 to connect the terminal building and the airplane 13.

The rotunda 5 is provided with a fixed walkway 23 along which passengers pass. The proximal-end tunnel 7 is provided, substantially along the whole length thereof, with a fixed walkway 25 along which passengers pass.

The distal-end tunnel 9 is provided with a variable-length walkway (a walkway portion) 27 with which the extension and contraction of a passage portion (passage position) 29 through which passengers pass can be adjusted.

The head 11 is provided with a fixed walkway 31 along which passengers pass. The rear end of the fixed walkway 31 (at the fixed bridge 3 side) is provided with an opening and closing step (an opening and closing walkway portion) 33 that constitutes a passage connecting with the passage portion 29.

The opening and closing step 33 is configured to be vertically pivoted about an axis extending in the width direction at the fixed walkway 31 side by a driving unit 34 so that the rear end is selectively brought into contact with the passage portion 29.

The upper surfaces of the fixed walkways 23, 25, and 31, the passage portion 29 of the variable-length walkway 27, and the opening and closing step 33 are configured to be located at a substantially fixed height.

The variable-length walkway 27 will be described with reference to FIGS. 2 to 5.

Figure 2:
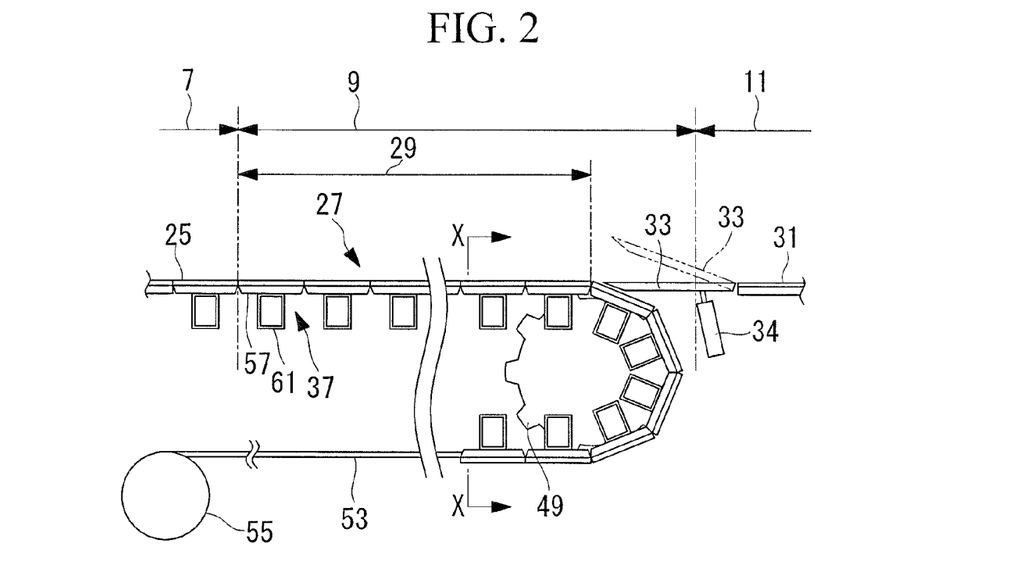
FIG. 2 is a longitudinal sectional view of a variable-length walkway according to the first embodiment of the present invention.
Figure 3:
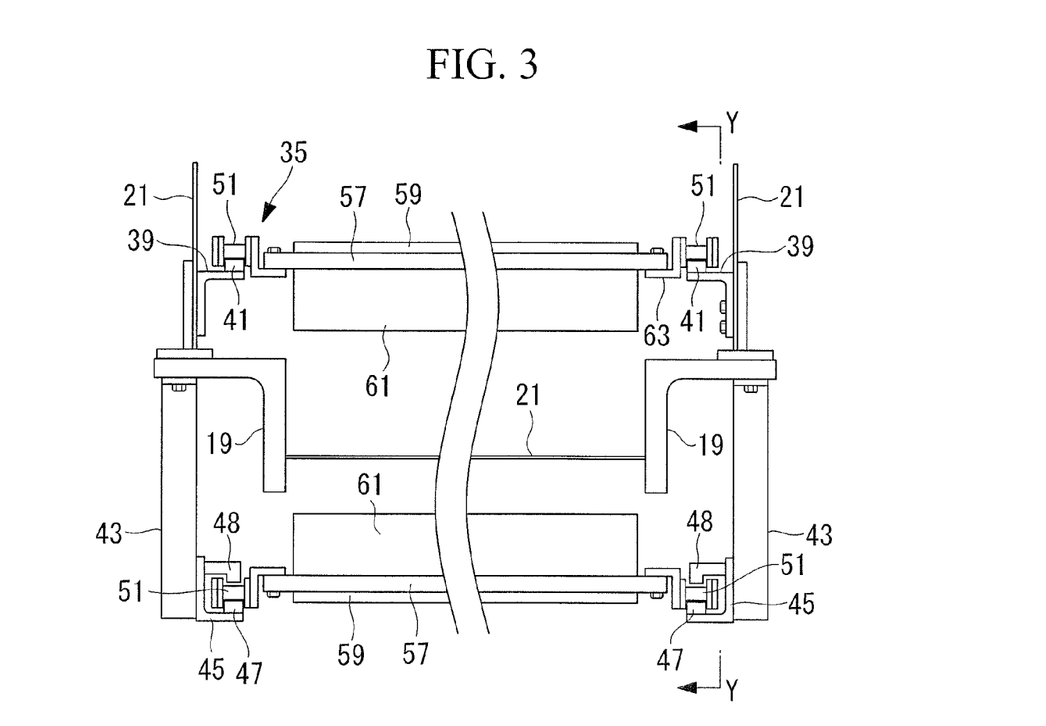
FIG. 3 is an X-X cross-sectional view of FIG. 2.
Figure 4:
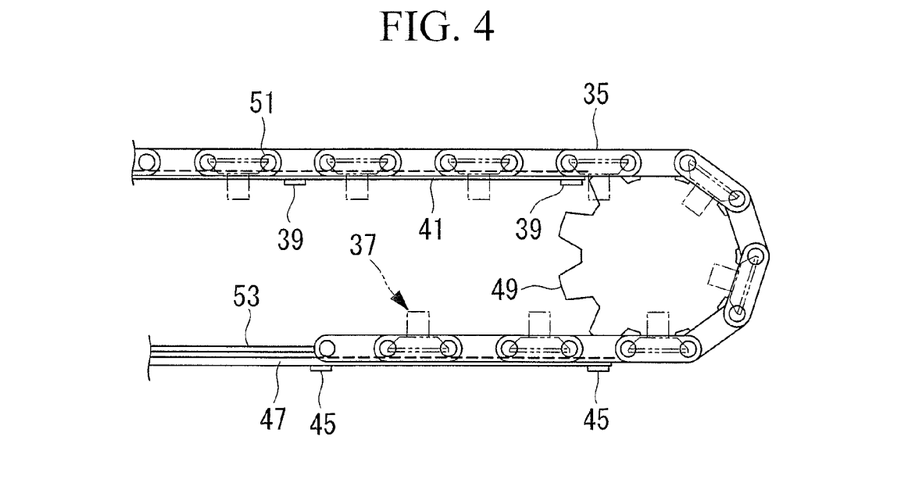
FIG. 4 is a diagram taken from Y-Y in FIG. 3.
Figure 5:
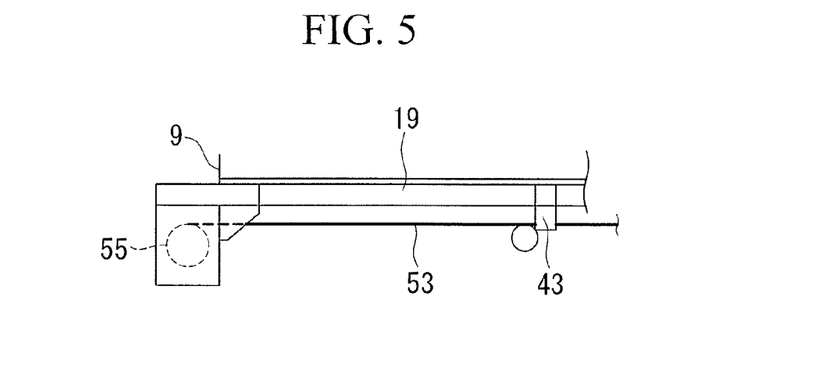
FIG. 5 is a fragmentary front view showing the configuration of the lower rear part of a distal-end tunnel according to the first embodiment of the present invention.

FIG. 2 is a longitudinal sectional view of the variable-length walkway 27. FIG. 3 is an X-X cross-sectional view of FIG. 2. FIG. 4 is a diagram taken from Y-Y in FIG. 3. FIG. 5 is a fragmentary front view showing the configuration of the lower rear part of the distal-end tunnel 9.

The variable-length walkway 27 is provided with a pair of chains 35 disposed on both sides of the distal-end tunnel 9 and a plurality of steps (divided walkway portions) 37, both ends of which are fixed to the chains 35, that form a passage.

A plurality of upper brackets 39 are provided inside the distal-end tunnel 9 and at the lower parts of the panels 21 on both sides, at substantially the same height at intervals in the longitudinal direction N. The upper brackets 39 have an L-shaped cross section and are mounted such that the tops are flat.

The rearmost upper bracket 39 is mounted at a position not too far away from the proximal-end tunnel 7 when the distal-end tunnel 9 moves to the extreme distal end. The upper bracket 39 at the extreme distal end is mounted in the vicinity of the distal end of the distal-end tunnel 9.

Upper guides 41, which are rod-like members having a substantially rectangular cross section, are bridged and fixed so as to be supported on the upper surfaces of the upper brackets 39.

A plurality of support members 43, which are rod-like members having a substantially rectangular cross section, are provided outside the distal-end tunnel 9 at certain intervals in the longitudinal direction, under the steel structural beams 19.

Lower brackets 45 having an L-shaped cross section are mounted inside the individual support members 43 and at the lower ends thereof. The lower brackets 45 are mounted such that the short sides protrude inward.

The support members 43 are mounted along the longitudinal direction N in substantially the same region as the region where the upper brackets 3 are mounted.

Lower guides 47, which are rod-like members having a substantially rectangular cross section, are bridged and fixed so as to be supported on the upper surfaces of the short sides of the lower brackets 45.

Movement restricting members 48, which are L-shaped cross-sectioned rod members, are mounted so as to be fixed to the lower brackets 45 and to extend in the longitudinal direction. The end face of the short side of the L shape of each movement restricting member 48 is located facing the lower guide 47 and slightly separated from a roller 51 of each chain 35.

Sprockets (position changing section, rotating body) 49 are disposed at the distal ends of the upper guides 41 and the lower guides 47.

The sprockets 49 are disposed such that the axial center extends along the width and is rotatably mounted to the distal-end tunnel 9.

The chains 35 are mounted such that the rear ends (first ends) thereof are fixed to the proximal-end tunnel 7 so as to wind around the sprockets 49. The rollers 51 of the chains 35 are guided by the upper guides 41 and the lower guides 47.

The chains 35 have a sufficient length to be located at the lower guides 47 even when the distal-end tunnel 9 moves to the extreme distal end.

The free ends of the chains 35 are each firmly joined with a rope 53. The rope 53 is wound around a rope retractor 55 mounted at the lower part of the rear end of the distal-end tunnel 9.

The steps 37 are each composed of a main body 57, which is a plate having a substantially trapezoidal cross section, a carpet 59 affixed to substantially the entire surface at the large-area side of the main body 57, and a reinforcement 61, fixed to the small-area side of the main body 57, that reinforces the main body 57.

The main body 57 is disposed such that the reinforcement 61 faces the inside of the tracks of the chains 35 and both ends thereof are fixed to protrusions 63 that protrude inward from the chains 35.

The reinforcement 61 is a hollow cuboid and is disposed along substantially the entire length of the main body 57.

The main body 57 and the reinforcement 61 are made of an aluminum alloy.

The steps 37 are mounted to the chains 35, with little clearance between adjacent steps.

The heights of the upper guides 41 are set so that the upper surfaces of the carpets 59 on the steps 37 mounted to the chains 35 guided by the upper guides 41 are at substantially the same height as the upper surface of the fixed walkway 25. That is, the steps 37 supported by the upper guides 41, and at the upper position of the sprockets 49 following them, form the passage portion 29. The steps 37 at the part supported by the lower guides 47 from the sprockets 49 form a walkway portion located at an outside-of-passage position in the present invention.

Accordingly, the length of the passage portion 29 is changed in accordance with the position of the sprockets 49, that is, the position of the distal-end tunnel 9 in the longitudinal direction N.

Since the steps 37 are divided in the longitudinal direction, adjacent steps can be curved around the sprockets 49. This allows the steps 37 to move around the sprockets 49 with the rotation of the sprockets 49; therefore, the steps 37 can be formed of a highly rigid material, that is, an aluminum alloy, for example, thus allowing the passage portion 29 to be constructed stably and strongly.

Since the passage portion 29 is disposed at a position where it does not interfere with the fixed walkway 25, it can be set at substantially the same height as the fixed walkway 25.

Since the length of the passage portion 29 changes as the distal-end tunnel 9 moves in the longitudinal direction N, by a length corresponding to the moving distance, as described later, the positional relationship with the opening and closing step 33 in the longitudinal direction N is always substantially the same even when the distal-end tunnel 9 moves.

Thus, a continuous passage can be formed from the rotunda 5 to the head 11.

Since a continuous passage with substantially the same height can be formed from the rotunda 5 to the head 11, problems such as falling/stumbling of passengers can be prevented. Passengers can pass therethrough with a feeling of safety, without such worries.

The operation of the above-described boarding bridge 1 according to this embodiment will be described.

The boarding bridge 1 stands by in a state in which the distal-end tunnel 9 is fitted onto the proximal-end tunnel 7 to a large extent, as indicated by the two-dot chain line in FIG. 1, that is, in a contracted state.

When the airplane 13 reaches a predetermined position, the movable leg 17 operates, so that the distal-end tunnel 9 moves toward the airplane 13. That is, the boarding bridge 1 is extended.

When the distal-end tunnel 9 moves toward the airplane 13, the sprockets 49 also move in the same direction, and thus, the force applied to the first ends of the chains 35 fixed to the proximal-end tunnel 7 overcomes the retracting force of the rope retractors 55, so that the chains 35 rotate the sprockets 49 toward the proximal-end tunnel 7. The rotation of the sprockets 49 moves the chains 35 from the lower guide 47 side toward the upper guide 41 side.

Since the steps 37 move to the passage portion 29 with the movement of the chains 35, the length of the passage portion 29 in the longitudinal direction N increases automatically by the moving distance of the sprockets 49, that is, the distal-end tunnel 9.

At that time, the opening and closing step 33 is retracted to the position indicated by the two-dot chain line in FIG. 2 by the driving unit 34 so as not to rub against and abrade the carpets 59 of the moving steps 37.

Once the head 11 is connected to the airplane 13, the opening and closing step 33 is lowered to make the passage portion 29 and the fixed walkway 31 a continuous passage.

Since the chains 35 are retracted by the rope retractors 55, the steps 37 located at the passage portion 29 receive a tension in the longitudinal direction N to form a more stable passage.

After passengers have passed therethrough, the head 11 is separated from the airplane 13 to move the distal-end tunnel 9 toward the rotunda 5. At that time, the opening and closing step 33 is retracted, as in the above.

When the distal-end tunnel 9 moves toward the rotunda 5, the sprockets 49 also move in the same direction, and thus, the chains 35 rotate the sprockets 49 toward the head 11 by the retracting force of the rope retractors 55. The rotation of the sprockets 49 moves the chains 35 from the upper guide 41 side toward the lower guide 47 side.

In this case, if the rope retractors 55 stop because of circumstances, for example, a power failure, the movement of the chains 35 on the lower guides 47 is not smooth and the chains 35 are curved around the rollers 51; however, since rising of the chains 35 due to such curving is restricted by the movement restricting members 48, the chains 35 can easily be moved by drawing the ropes 53 with an appropriate mechanism.

Figure 6:
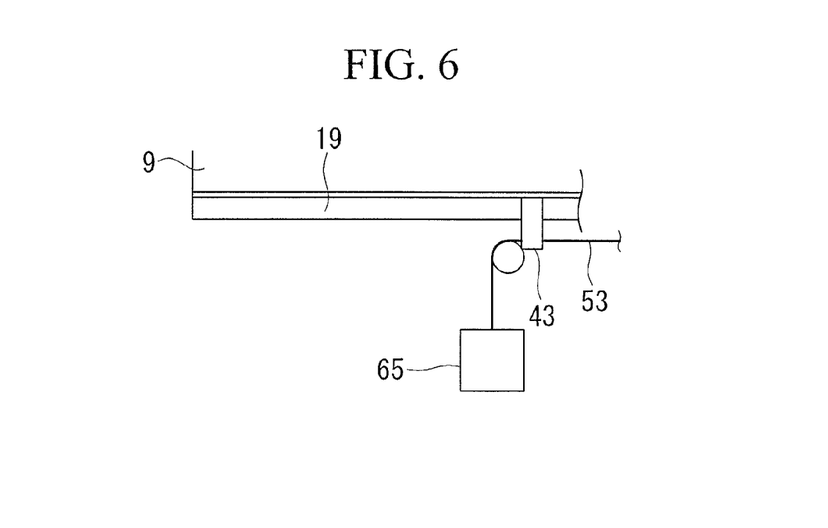
FIG. 6 is a schematic diagram showing the configuration of another form of a rope retractor according to the first embodiment of the present invention.

Although this embodiment uses the rope retractors 55 to apply a retracting force to the chains 35, a weight 65 may be mounted to the free end of the rope 53, as shown in FIG. 6, if there is an allowance in height.

This can simplify the structure and can allow it to be manufactured at low cost.

Although this embodiment is configured such that the carpet 59 is affixed to the upper surface of each step 37 to form an integrated unit, the carpet 59 may be separate from each step 37.

Figure 7:
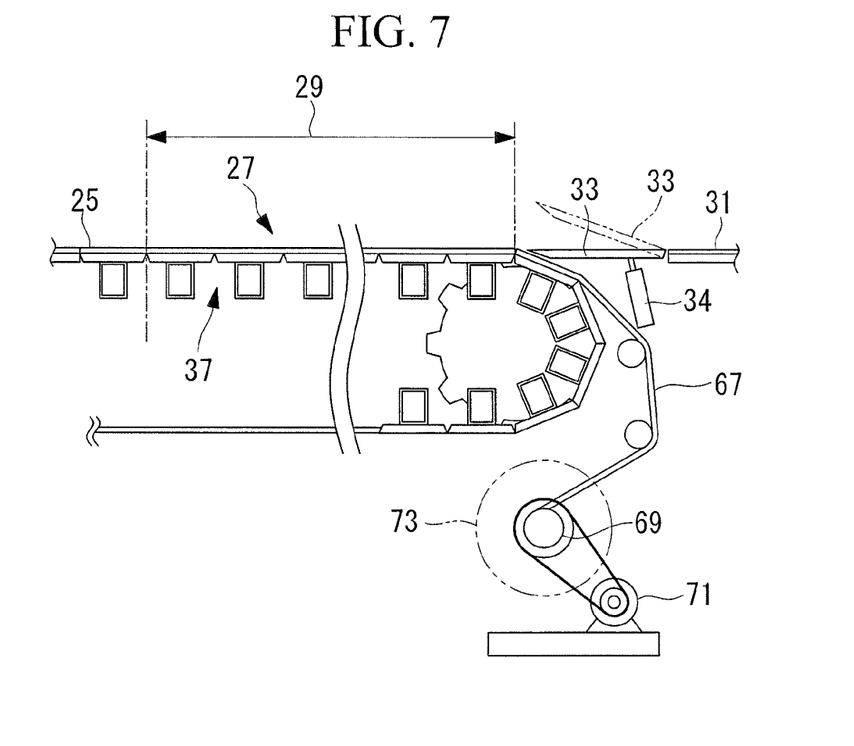
FIG. 7 is a longitudinal sectional view showing another form of the variable-length walkway according to the first embodiment of the present invention.

For example, as shown in FIG. 7, a carpet 67 longer than the longest passage portion 29 may be used, one end of which may be fixed to the fixed walkway 25 and the other end of which may be taken up by a take-up drum 69 that is rotated by a motor 71.

That is, the carpet 67 is fed to or taken up from the passage portion 29 by rotating the take-up drum 69 in accordance with changes in the length of the passage portion 29.

In this case, the take-up drum 69 needs to be disposed at a position where a circumference 73 does not interfere with the steps 37 when the carpet 67 is taken up most, that is, when the passage portion 29 has become the shortest.

In this case, the carpets 59 may be affixed to the upper surfaces of the steps 37, as in the above, and the carpet 67 may be disposed thereon. In this case, the carpets 59 and the carpet 67 may be detachably attached with a hook-and-loop fastener.

Furthermore, although this embodiment is configured such that the passage of the variable-length walkway 27 is constructed of the longitudinally divided steps 37, the present invention is not limited to that.

Figure 8:
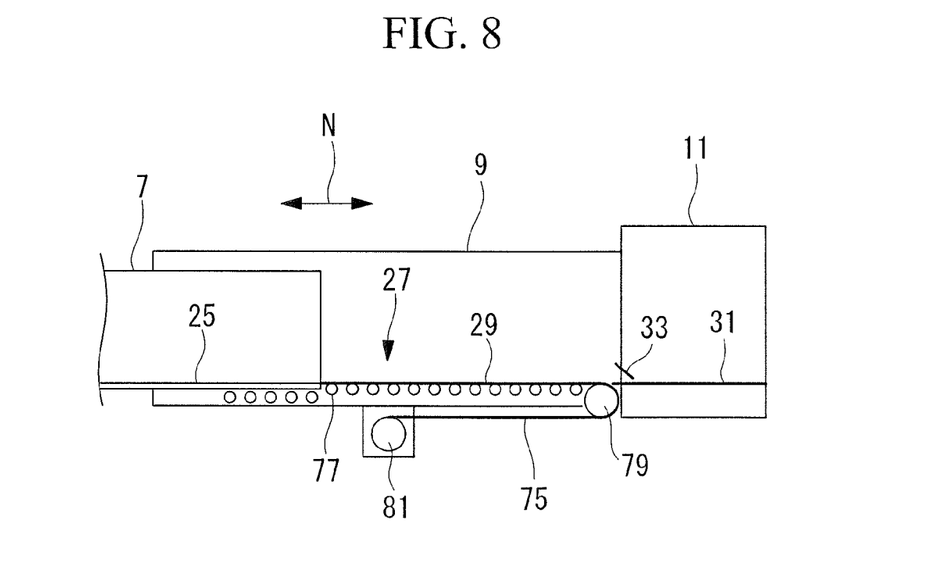
FIG. 8 is a longitudinal sectional view showing yet another form of the variable-length walkway according to the first embodiment of the present invention.

For example, as shown in FIG. 8, a wide belt member (walkway portion) 75 may be used.

The belt member 75 is provided with a reinforcement therein so that it is reinforced.

In this case, the belt member 75 of the passage portion 29 is supported by rollers 77 that are disposed at predetermined intervals along the longitudinal direction N.

The rollers 77 are configured to be vertically movable and are moved downward at a location where the passage portion 29 is not provided, that is, where they overlay the proximal-end tunnel 7, so as not to interfere with the proximal-end tunnel 7.

The belt member 75 is wound around a roller (a position changing section, a rotating body) 79 and is unwound and rewound by a take-up drum 81.

Second Embodiment

Next, a second embodiment of the present invention will be described with reference to FIGS. 9 to 13.

This embodiment is similar to the first embodiment in basic configuration but differs in the configuration of the variable-length walkway 27. Thus, in this embodiment, only the differences will be described, and duplicated descriptions of the other parts will be omitted.

The same components as those in the first embodiment are given the same reference numerals and descriptions thereof will be omitted.

Figure 9:
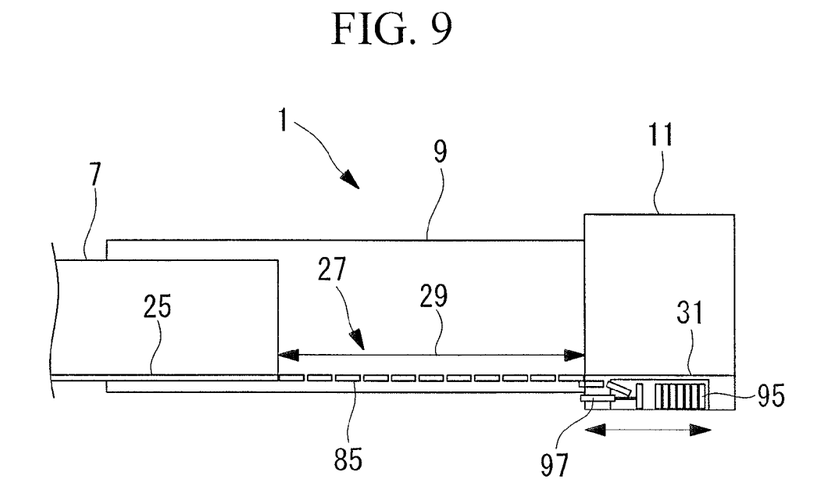
FIG. 9 is a longitudinal sectional view of a boarding bridge according to a second embodiment of the present invention.
Figure 10:
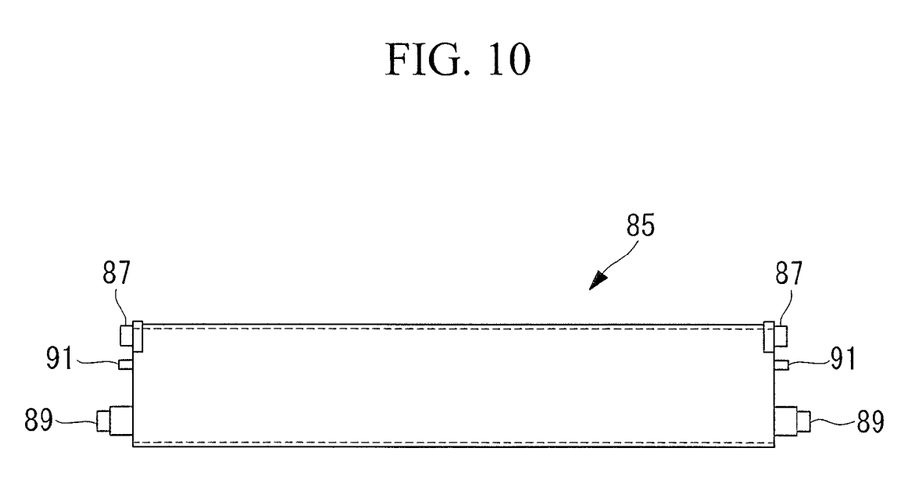
FIG. 10 is a plan view showing a plate according to the second embodiment of the present invention.
Figure 11:
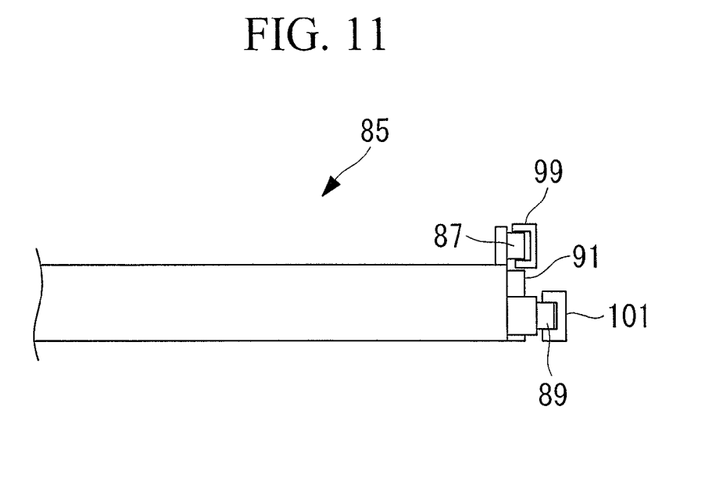
FIG. 11 is a fragmentary front view of the plate according to the second embodiment of the present invention.
Figure 12:
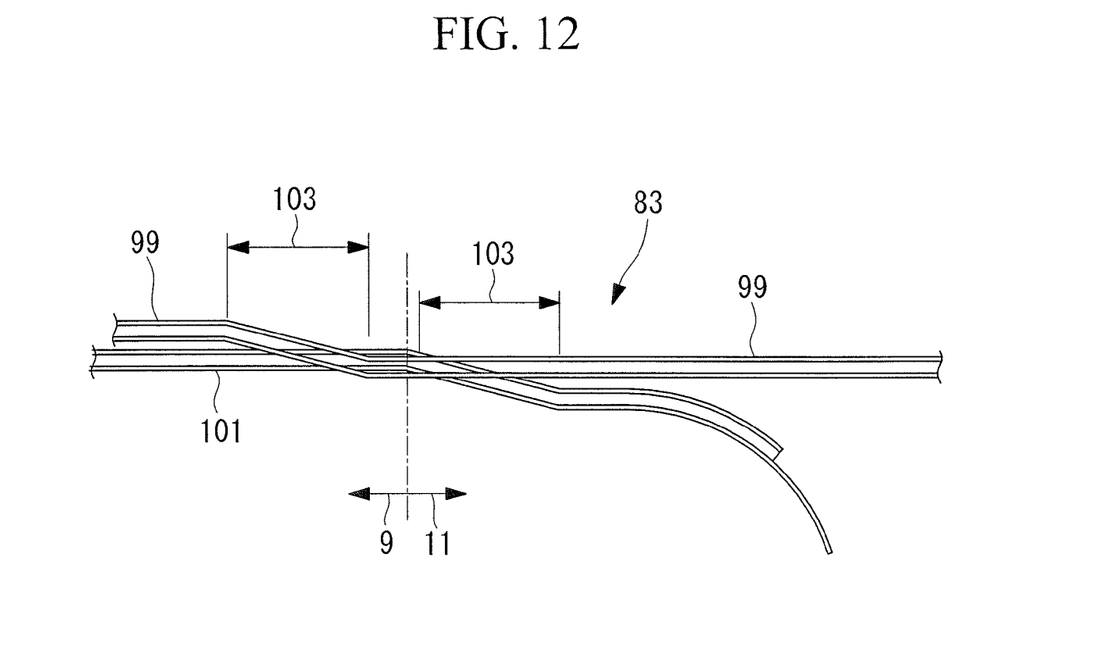
FIG. 12 is a fragmentary front view showing part of a guide according to the second embodiment of the present invention.
Figure 13:
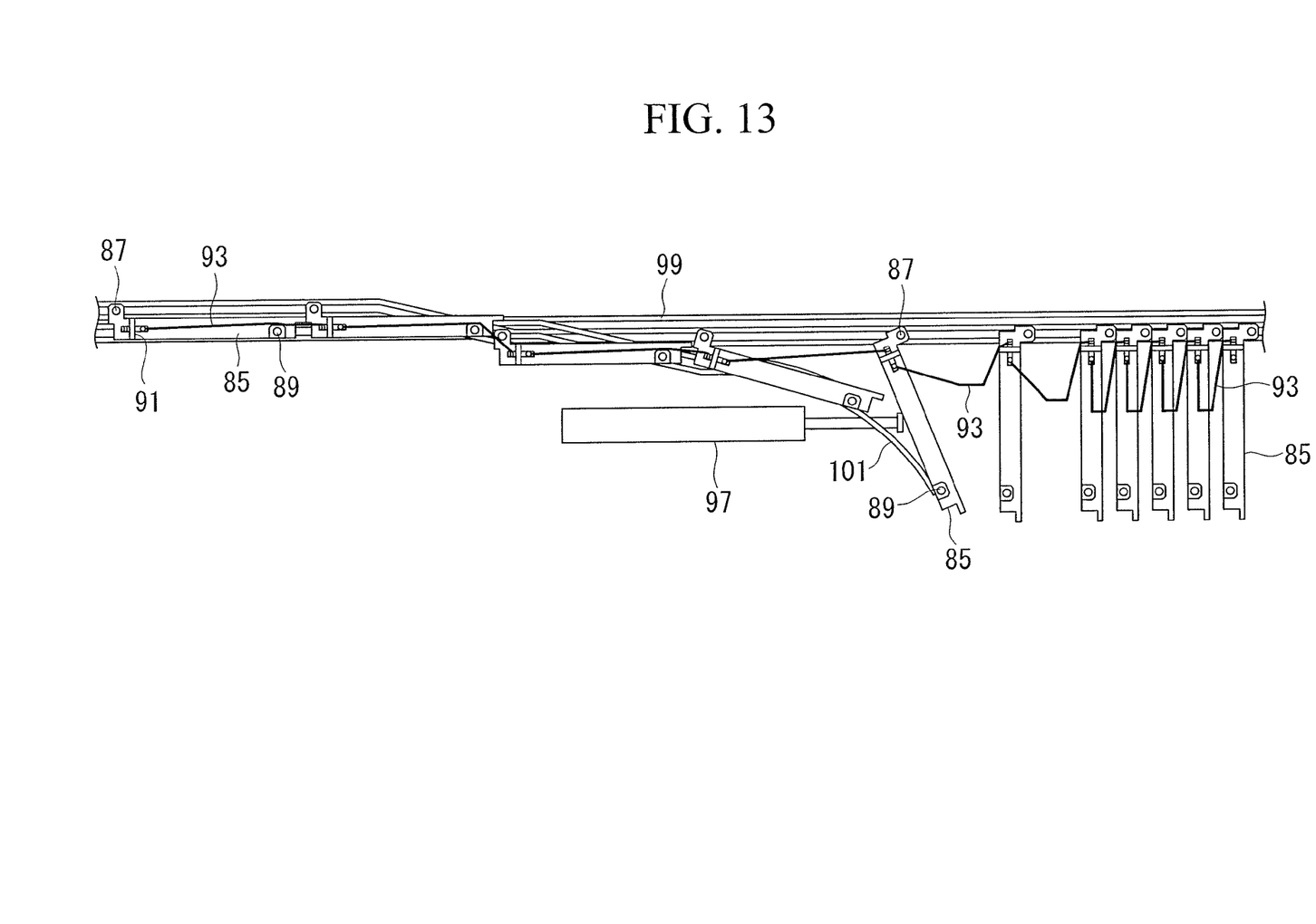
FIG. 13 is a schematic diagram showing the operation of the plate according to the second embodiment of the present invention.

FIG. 9 is a longitudinal sectional view of a boarding bridge 1. FIG. 10 is a plan view showing a plate. FIG. 11 is a fragmentary front view of the plate. FIG. 12 is a fragmentary front view showing part of a guide. FIG. 13 is a schematic diagram showing the operation of the plate.

In this embodiment, the variable-length walkway 27 is constituted by a pair of guide units 83 disposed on both sides of the distal-end tunnel 9 and a plurality of plates (divided walkway portions) 85 both ends of which are guided by the guide units 83 to form a passage.

The plates 85 are long, thin, substantially rectangular cuboid boxes made of an aluminum alloy.

Upper guide rollers 87 are mounted on both sides at the rear end of the upper surface of the plate 85 in such a manner as to protrude to the sides.

Lower guide rollers 89 are mounted on both side surfaces of the lower part at the distal end of the plate 85 in such a manner as to protrude more than the upper guide rollers 87. Rope guides 91 are also provided.

As shown in FIG. 13, adjacent plates 85 are connected together by a rope 93. The length of the rope 93 is set so as to form a slight clearance between adjacent plates 85 when arranged side by side horizontally.

The plate 85 closest to the proximal-end tunnel 7 is fixed to the proximal-end tunnel 7.

A housing 95 for accommodating the plates 85 is provided in the lower part of the head 11. A driving unit 97 that pushes the plates 85 toward the housing 95 is provided at the distal-end-tunnel 9 side of the housing 95.

The guide units 83 are each provided with an upper guide 99 that guides the upper guide rollers 87 and a lower guide 101 that guides the lower guide rollers 89.

The upper guide 99 and the lower guide 101 are mounted to the reinforced panel 21 at different positions in the width direction so as not to interfere with each other.

The upper guide 99 is mounted so as to cover the region between the distal-end tunnel 9 and the housing 95. Most of the upper guide 99 at the distal-end tunnel 9 is substantially horizontal, the distal end thereof having an inclined portion (a position changing section) 103 that is inclined obliquely downward. The upper guide 99 is disposed substantially horizontally from the distal end of the inclined portion 103 to the distal end of the housing 95.

The lower guide 101 is formed substantially parallel to the upper guide 99 up to the inclined portion 103 in such a manner as to be shifted to the distal end side by the gap between the upper guide roller 87 and the lower guide roller 89.

The lower guide 101 is curved downward from the distal end of the inclined portion 103, and the end thereof serves as a downward guide only (see FIGS. 12 and 13).

The heights of the substantially horizontal portions of the upper guide 99 and the lower guide 101 at the distal-end tunnel 9 are set so that the upper surfaces of the plates 85 are at substantially the same height as the upper surfaces of the fixed walkways 25 and 31.

Since the passage portion 29 is thus disposed in a position where it does not interfere with the fixed walkway 25, it can be set at substantially the same height as the fixed walkway 25.

Since the length of the passage portion 29 changes as the distal-end tunnel 9 moves in the longitudinal direction N by a length corresponding to the moving distance, as will be described below, the positional relationship in the longitudinal direction N with the fixed walkway 31 is substantially the same even if the distal-end tunnel 9 moves.

Thus, a continuous passage is formed from the rotunda 5 to the head 11.

Since a continuous passage having the same height can be formed from the rotunda 5 to the head 11 in this way, problems such as falling/stumbling of passengers can be prevented. Passengers can pass therethrough with a feeling of safety, without such worries.

The operation of the above-described boarding bridge 1 according to this embodiment will be described.

The plates 85 are accommodated, with no tension applied to the rope 93, such that the lower guide rollers 89 are located at lower positions, as shown in FIG. 13.

When the boarding bridge 1 is extended from its stand-by position toward the airplane 13, tension is gradually applied to the rope because the plate 85 at the rear end is fixed to the proximal-end tunnel 7, so that the plates 85 accommodated in the housing 95 are drawn out one after another.

The plates 85 drawn out are each inclined toward the rear end as the lower guide rollers 89 come into contact with and are guided by the lower guide 101.

The plates 85 become substantially horizontal when the upper guides 99 and the lower guides 101 come near the inclined portion 103.

When passing along the inclined portion 103, the plate 85 reaches a height at which it forms the passage portion 29. This is repeated in sequence to form the passage portion 29 having a predetermined length.

Accordingly, the length of the passage portion 29 in the longitudinal direction N is automatically increased by a distance corresponding to the movement of the distal-end tunnel 9.

After passengers have passed therethrough, the head 11 is separated from the airplane 13 to move the distal-end tunnel 9 toward the rotunda 5.

When the distal-end tunnel 9 moves toward the rotunda 5, the tension of the rope 93 is lost, so that the plates 85 are pushed by the plates 85 at the rear end side to gradually move along the upper guides 99 and the lower guides 101 to positions where the lower guide rollers 89 are located at lower positions, opposite to the above, and move into the housing 95.

The driving unit 97 is operated to move the plates 85 deep into the housing 95 one after another.

Providing the opening and closing step 33 between the passage portion 29 and the fixed walkway 31, as in the first embodiment, can further improve the continuity therebetween.

A carpet may be affixed to the upper surfaces of the plates 85.

It is to be understood that the present invention is not limited to the above-described embodiments and may be modified as appropriate without departing from the spirit and scope of the present invention.

Figure 14:
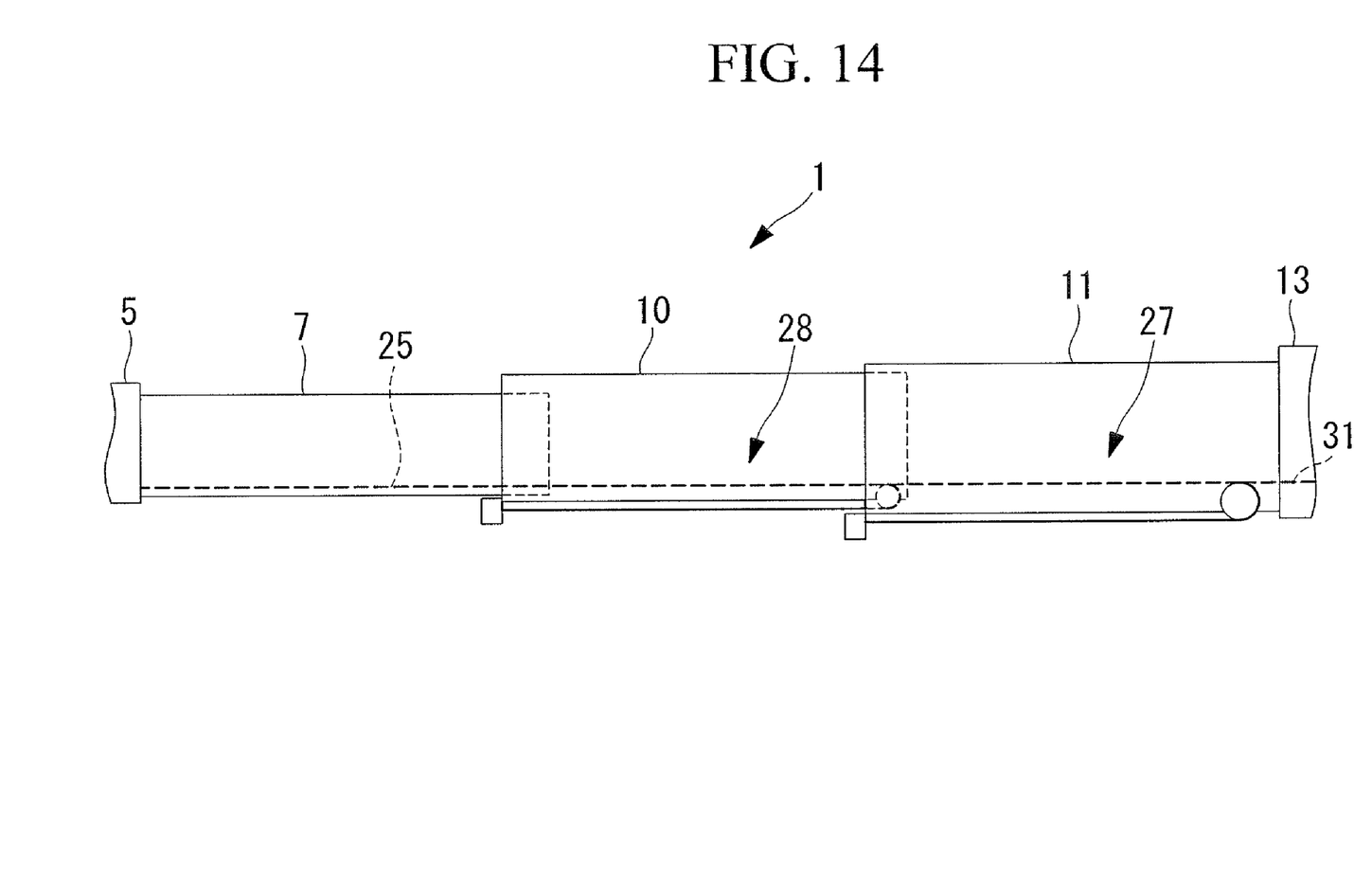
FIG. 14 is a front view showing the schematic configuration of another form of the boarding bridge according to the first embodiment of the present invention.

For example, as shown in FIG. 14, the present invention can be applied to a boarding bridge 1 provided with an intermediate tunnel 10 between the proximal-end tunnel 7 and the distal-end tunnel 9.

In this case, the intermediate tunnel 10 is provided with a variable-length walkway 28 having substantially the same structure as the variable-length walkway 27 of the first embodiment. One end of the variable-length walkway 28 is connected to the fixed walkway 25. One end of the variable-length walkway 27 of the distal-end tunnel 9 is fixed to a position close to the other end of the variable-length walkway 28.

A plurality of the intermediate tunnel 10 may be provided.

What is claimed is:

1. A boarding bridge, comprising:
a plurality of tubular gangway units telescopically moveable relative to one another in a longitudinal direction, wherein the plurality of tubular gangway units comprise at least an inside gangway unit and an outside gangway unit, the inside gangway unit being disposed inside of the outside gangway unit; and
a variable-length walkway portion being configured to move between a passage position height and an outside-of-passage position height, the outside-of-passage position height being lower than the passage position height;
wherein a length of the walkway portion at the passage position height changes when the inside and outside gangway units move relative to one another,
wherein a first end of the walkway portion is mounted to the inside gangway unit so as not to move in position with respect to the inside gangway unit,
wherein a second end of the walkway portion comprises a position changing section that permits the walkway portion to move between the passage position height and the outside-of-passage position height, the position changing section being integrally mounted to the outside gangway unit,
wherein the position changing section comprises a rotating body rotatably mounted in a fixed position to the outside gangway unit such that an axis of the rotating body is parallel to a width direction of the walkway portion, and
wherein the walkway portion is tensioned to wind at least partially around the rotating body.

2. The boarding bridge according to claim 1, further comprising an opening and closing walkway portion, positioned where the walkway portion moves between the passage position height and the outside-of-passage position height, wherein the opening and closing walkway portion forms an extension of the walkway portion.

3. The boarding bridge according to claim 1, wherein the walkway portion comprises a plurality of walkway segments arranged side-by-side along the length of the walkway portion.

4. The boarding bridge according to claim 3, wherein:
the walkway segments have lateral ends that are fixed to a pair of chains disposed adjacent thereto; and
a first end of each chain is fixed to the inside gangway unit, a second end of each chain is wound around a sprocket that is rotatably mounted to the outside gangway unit, each chain is tensioned by a predetermined tension around each sprocket, and the sprockets comprise at least part of a position changing section that permits the walkway portion to move between the passage position height and the outside-of-passage position height.

5. The boarding bridge according to claim 3, wherein lateral ends of the walkway segments are configured to engage with a pair of guide units fixed to inside surfaces of the outside gangway unit;
the guide units each have a portion at the passage position height and a portion at the outside-of-passage position height, permitting the walkway segments to move from the passage position height to the outside-of-passage position height;
the walkway segments are connected to one another to allow a predetermined vertical movement therebetween and to present a small gap therebetween when the walkway segments are at the passage position height; and
a first end of the walkway portion is fixed to the inside gangway unit.

6. A boarding bridge, comprising:
a plurality of tubular gangway units telescopically moveable relative to one another in a longitudinal direction, wherein the plurality of tubular gangway units comprise at least an inside gangway unit and an outside gangway unit, the inside gangway unit being disposed inside of the outside gangway unit; and
a variable length walkway portion being configured to move between a passage position height and an outside-of-passage position height, the outside-of-passage position height being lower than the passage position height;
wherein a length of the walkway portion at the passage position height changes when the inside and outside gangway units move relative to one another,
wherein the walkway portion comprises a plurality of walkway segments arranged side-by-side, along the length of the walkway portion,
wherein the walkway segments have lateral ends that are fixed to a pair of chains disposed adjacent thereto, and
wherein a first end of each chain is fixed to the inside gangway unit, a second end of each chain is wound around a sprocket that is rotatably mounted to the outside gangway unit, each chain is tensioned by a predetermined tension around each sprocket, and the sprockets comprise at least part of a position changing section that permits the walkway portion to move between the passage position height and the outside-of-passage position height.

7. The boarding bridge according to claim 6, wherein;
a first end of the walkway portion is mounted to the inside gangway unit so as not to move in position with respect to the inside gangway unit; and
a second end of the walkway portion comprises a position changing section that permits the walkway to move between the passage position height and the outside-of-passage position height, the position changing section being integrally mounted to the outside gangway unit.

8. The boarding bridge according to claim 6, further comprising an opening and closing walkway portion, positioned where the walkway portion moves between the passage position height and the outside-of-passage position height, wherein the opening and closing walkway portion forms an extension of the walkway portion.

9. The boarding bridge according to claim 6, wherein lateral ends of the walkway segments are configured to engage with a pair of guide units fixed to inside surface of the outside gangway unit;
the guide units each have a portion at the passage position height and a portion at the outside-of-passage position height, permitting the walkway segments to move from the passage position height to the outside-of-passage position height;

the walkway segments are connected to one another to allow a predetermined vertical movement therebetween and to present a small gap therebetween when the walkway segments are at the passage position height; and a first end of the walkway portion is fixed to the inside gangway unit.

* * * * *